Jan. 4, 1955
W. H. NEWTON
2,698,685
MAGNETIC SEPARATOR
Filed Nov. 30, 1953
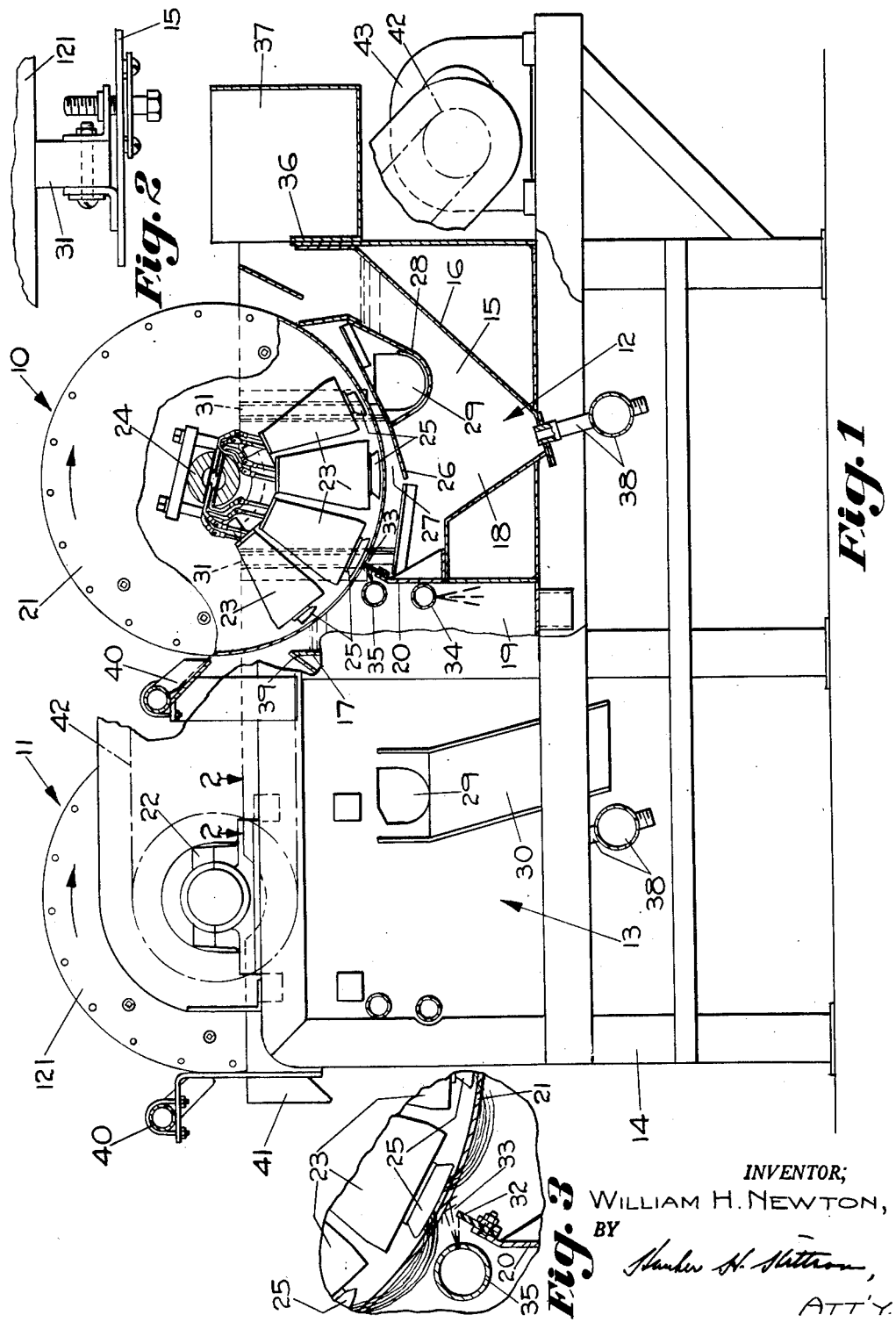
INVENTOR;
WILLIAM H. NEWTON,
BY
ATT'Y.

United States Patent Office 2,698,685
Patented Jan. 4, 1955

2,698,685

MAGNETIC SEPARATOR

William H. Newton, Blacklick, Ohio, assignor to The Jeffrey Manufacturing Company, a corporation of Ohio Application November 30, 1953, Serial No. 395,164

11 Claims. (Cl. 209—223)

This invention relates to magnetic separators and one object of the invention is to provide an improved apparatus of this type.

A more specific object of the invention is to provide an improved magnetic separator including improved means for washing entrained non-magnetic materials from magnetic materials where the latter pass from one strong magnetic field to another and from one cell of the separator to another.

Other objects of the invention will appear hereinafter, the novel features and combinations being set forth in the appended claims.

In the accompanying drawings:

Fig. 1 is a side view in elevation, with parts broken away, of a magnetic separator apparatus that includes the invention;

Fig. 2 is a view in section, the section being taken on line 2—2 of Fig. 1; and

Fig. 3 is a view drawn to a larger scale and showing more clearly important details of the apparatus seen in Fig. 1.

The magnetic separator apparatus shown in Fig. 1 of the drawings is a two stage separator apparatus, that is, it includes as a unit, two drum type magnetic separator mechanisms 10 and 11. Separator 10 discharges magnetic materials into separator 11 and separators 10 and 11 are joined in such a manner that their individual tanks or water boxes 12 and 13 respectively, form a unit carried within a suitable main frame 14. Because the separator apparatus is actually two single drum type separator apparatuses associated as above set forth, a description of the separator 10 also describes the separator 11, and, therefore, the entire apparatus.

Tank or box 12 of separator 10 is formed by spaced vertical side walls 15, a front wall 16 and a back wall 17 which cooperate to form a main tank or box that is divided into two open topped box-like cells or compartments 18 and 19 by a generally upright partition 20.

A magnetic materials carrier in the form of a closed cylinder or drum 21 of non-magnetic material is carried for rotation on a horizontal axis through bearings 22 on main frame 14 in such manner that its bottom portion submerges in the water in the box-like cells 18 and 19. Within cylinder or drum 21 there is a plurality of radially disposed side by side electromagnets 23 carried from a fixed shaft 24. The poles 25 of these magnets extend axially across the inside of the drum 21 and they lie very close to its inside cylindrical surface so that the peripheral cylindrical wall of the drum will pass through the magnetic fields created by the magnets 23 as close as possible to the poles 25. Magnets 23 are connected electrically in such manner that adjacent magnet poles 25 of the magnet assembly formed by the magnets 23 will be of opposite polarity when the magnets 23 are energized.

Below the lower portion of the drum 21 there is a sloping plate 26 that extends between and is connected at its ends to the side walls 15 of cell 18. This plate 26 cooperates with the drum 21 to form a long thin relatively wide passageway 27 through which non-magnetic materials must pass before they enter a discharge trough 28 located below the plate 26 that extends transversely across the cell 18 and discharges non-magnetic materials through an opening 29 in each of its side walls 15 and into troughs 30 that carry the non-magnetic materials from the apparatus.

The upright partition 20 that divides the tank or water box 12 into the two box-like cells 18 and 19 terminates at its top adjacent the bottom or radially outermost peripheral surface of the carrier or drum 21 and it extends transversely across the water box 12 between the side walls 15 and axially across the face of the carrier or drum 21 and radially directly outwardly of the center of one of the magnet poles 25 which is positioned between two others of the magnet poles 25. The ends of the cylinder or drum 21 are sealed to the side walls 15 of tank or water box 12 by a plurality of wipers 31, two of which form upwardly extending continuations of the partition 20.

The upper portion of partition 20 is formed by a thin strip 32 of rubber or like material and the upper edge of this strip 32 is spaced from the cylindrical peripheral surface of drum or carrier 21 a distance of the order of one-fourth inch, for example, so that it will cooperate with the material carrying surface of the drum 21 to provide an elongated thin narrow slot 33 that extends through the full width of the material carrier, that is, throughout the axial length of the material carrying surface of drum 21. All materials which reach cell 19 from the cell 18 must have passed through this slot 33.

A water pipe 34 supplies the second cell 19 with water in a manner to agitate the water in cell 19 and to maintain the water head or level in cell 19 substantially higher than the water level in cell 18. Because of this difference between the water levels in cells 18 and 19 water will flow by reason of gravity from the cell 19 through the slot 33 counter to the direction of travel of the carrier drum 21 and into the first cell 18.

In order to increase the velocity and consequently the volume of water flowing through the slot 33, a pipe 35 is provided in the cell 19 and this pipe 35 extends transversely across the cell 19 parallel to the partition 20 and it directs many jets of fresh water toward the slot 33 and consequently the material carrying surface of drum 21 and the first cell 18. These jets of water react with and/or upon the water flowing toward the slot 33 to provide a thin sheet-like current of water of relatively high velocity directed at the slot 33 throughout the length of the latter and through which any materials which reach the cell 19 from the cell 18 must pass. This sheet-like current of high velocity washing water forms a very effective barrier through which non-magnetic materials will not pass to enter the cell 19 for reasons explained in full detail hereinafter.

In the operation of the first separator 10, a wet mixture or slurry of magnetic and non-magnetic materials to be separated is fed to the cell 18 over a weir 36 from a feed box 37. These materials upon entering the cell 18 pass between the front wall 16 and the trough 28 and as they approach the bottom of the cell 18 they are met by upwardly flowing streams of water issuing through the bottom of cell 18 from a manifold 38 which direct and elevate the materials against the lower portion of carrier or drum 21 that is submerged within the cell 18.

The magnets 23 will cause magnetic materials to be drawn tightly against the carrier or drum 21 and the flow of water counter to the direction of rotation of the drum 21 through the passageway 27 will carry the non-magnetic materials into the trough 28 to be discharged from the apparatus. Any magnetic materials traveling with the non-magnetic materials toward the discharge trough 28 will be attracted to the drum 21 in the passageway 27 and moved by it toward the cell 19.

As indicated by Fig. 3 of the drawings, the lines of magnetic force are greater between adjacent magnet poles 25 than at the center of these poles, or in other words, there is a stronger magnetic field between each pair of adjacent magnet poles than there is at the center of each pole 25. This phenomenon plays an important role in this invention. As set forth previously, the slot 33 extends longitudinally of one of the intermediate magnet poles 25 and is positioned at its center and therefore in a position where there is a relatively weak magnetic field that is between two strong magnetic fields. As the carrier or drum 21 rotates toward the slot 33 the magnetic materials being carried by it will jump from one strong magnetic field to the next and while passing through the relatively weak magnetic field at the center of a magnet pole these materials will form into a thin layer or sheet which may be washed vigorously to free the magnetic materials of any entrained non-magnetic materials which latter will be worked back into the cell 18 by the sheet-like current of water flowing from cell 19 through the slot 33.

Magnetic materials after passing through the washer and water seal created at the slot 33 enter the second cell 19 and are carried through it toward a discharge lip 39 at the top of the tank back wall 17. Actually this discharge lip 39 is a portion of the front wall of the separator apparatus 11 which corresponds with front wall 16 of separator 10. A spray 40 is provided above the lip 39 for washing magnetic materials from the carrier or drum 21 after the materials have passed from the influence of the last magnet 23.

It will be seen that substantially all materials that enter the second separator 11 have magnetic properties. In this second separator materials having the greatest magnetic properties are discharged from the apparatus as a final product through a discharge chute 41 and the materials having lesser magnetic properties discharged from separator 11 may be fed through the troughs 36 to be crushed and returned for retreatment to the feed of the separator 10.

The cylinders or drums 21 and 121 of separators 10 and 11 respectively, are interconnected by a chain and sprocket drive mechanism indicated generally at 42 that includes a motor 43 mounted at the feed end of the apparatus on a platform formed integral with main frame 14.

From the foregoing it will be seen that by this invention there has been provided an improved magnetic separator apparatus including an improved magnetic material washing means which is also a means that is very efficient in permitting magnetic materials to flow from one separator cell to another while rejecting non-magnetic materials.

It will also be apparent that this invention provides an improved magnetic separator which includes a single cell for receiving the raw material to be separated and from which magnetic materials may be removed directly in a clean state, that is, free of non-magnetic materials, simply upon passing through the single simple washer and seal herein described which is formed by the cell 19, the slot 33, the particular relation of the slot 33 to the magnetic fields and the sheet-like current of water flowing through the slot 33.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. A magnetic separator including a rotatable drum of non-magnetic material, magnets in said drum having radially spaced pole faces near the lower portion of said drum providing successive strong magnetic fields through which said drum rotates, a tank adapted to hold water in which the lower portion of said drum submerges, means dividing said tank into two box-like cells having open tops into which the submerged portion of said drum extends, said dividing means having a top edge spaced below the bottom of said drum cooperating therewith to provide a narrow elongated slot extending transversely of said drum between two of said strong magnetic fields and through which magnetic materials must pass from one cell to enter the second cell, means for supplying water to both of said cells and for maintaining a greater head of water in said second cell whereby water flows by gravity counter to the direction of rotation of said drum through said slot and into said first named cell, and means for directing a strong sheet-like current of water in said second cell toward said drum and slot throughout the length of the latter and toward said first named cell thereby subjecting magnetic materials to a strong current of washing water as they pass through said slot and between said two strong magnetic fields.

2. A magnetic separator including a rotatable drum of non-magnetic material, magnets in said drum having radially spaced pole faces near the lower portion of said drum providing successive strong magnetic fields through which said drum rotates, a tank adapted to hold water in which the lower portion of said drum submerges, means dividing said tank into two box-like cells having open tops into which the submerged portion of said drum extends, said dividing means having a top edge spaced below the bottom of said drum cooperating therewith to provide a narrow elongated slot extending transversely of said drum between two of said strong magnetic fields and through which magnetic materials must pass from one cell to enter the second cell, means for supplying water to said second cell whereby water flows by gravity counter to the direction of rotation of said drum through said slot and into said first named cell, and means for directing a strong sheet-like current of water in said second cell toward said drum and slot throughout the length of the latter and toward said first named cell thereby subjecting magnetic materials to a strong current of washing water as they pass through said slot and between said two strong magnetic fields.

3. A magnetic separator including a rotatable drum of non-magnetic material, magnets in said drum having radially spaced pole faces near the lower portion of said drum providing successive strong magnetic fields through which said drum rotates, a tank adapted to hold water in which the lower portion of said drum submerges, means dividing said tank into two box-like cells having open tops into which the submerged portion of said drum extends, said dividing means having a top edge spaced below the bottom of said drum cooperating therewith to provide a narrow elongated slot extending transversely of said drum between two of said strong magnetic fields and through which magnetic materials must pass from one cell to enter the second cell, and means for directing a strong sheet-like current of water in said second cell toward said drum and slot throughout the length of the latter and toward said first named cell thereby subjecting magnetic materials to a strong current of washing water as they pass through said slot and between said two strong magnetic fields.

4. A magnetic separator including means forming a tank adapted to contain water, means dividing said tank into two generally open topped cells, travelling carrier means submerged in said tank for carrying magnetic materials from one of said cells through the other, magnets above said carrier having pole faces near the carrier providing successive strong magnetic fields through which said carrier travels, said dividing means terminating closely adjacent said carrier means and cooperating therewith to provide a narrow elongated slot extending transversely of said carrier between two of said strong magnetic fields and through which magnetic materials must pass from one cell to enter the second cell, means for supplying water to both of said cells and for maintaining a greater head of water in said second named cell whereby water flows by gravity counter to the direction of travel of said carrier means through said slot and into said first named cell, and means for directing a strong current of water in said second cell toward said carrier means and slot throughout the length of the latter and toward said first named cell thereby subjecting magnetic materials to a strong current of washing water as they pass through said slot and between said two strong magnetic fields.

5. A magnetic separator including means forming a tank adapted to contain water, means dividing said tank into two generally open topped cells, travelling carrier means submerged in said tank for carrying magnetic materials from one of said cells through the other, magnets above said carrier having pole faces near the carrier providing successive strong magnetic fields through which said carrier travels, said dividing means terminating closely adjacent said carrier means and cooperating therewith to provide a narrow elongated slot extending transversely of said carrier between two of said strong magnetic fields and through which magnetic materials must pass from one cell to enter the second cell, means for supplying water to said second cell whereby water flows by gravity counter to the direction of travel of said carrier means through said slot and into said first named cell, and means for directing a strong current of water in said second cell toward said carrier means and slot throughout the length of the latter and toward said first named cell thereby subjecting magnetic materials to a strong current of washing water as they pass through said slot and between said two strong magnetic fields.

6. A magnetic separator including a rotatable drum of non-magnetic material, magnets in said drum having radially spaced pole faces near the lower portion of said drum providing strong successive magnetic fields through which said drum rotates, a tank adapted to hold water into which the lower portion of said drum submerges, means dividing said tank into two cells through which said drum conveys magnetic materials said means terminating closely adjacent said drum and extending axially thereof and cooperating therewith to provide a narrow elongated slot through which magnetic materials must pass from one cell to enter the second cell, means for supplying water to both of said cells and for maintaining a greater head of water in said second cell whereby water flows by gravity counter to the direction of rotation of said drum through said slot and into said first cell, and means for directing a strong sheet-like current of water at said drum between two of said strong magnetic fields adjacent said slot and throughout the length of the latter thereby subjecting magnetic materials to a strong current of washing water adjacent said slot and where said materials pass from one strong magnetic field into another.

7. A magnetic separator including a rotatable drum of non-magnetic material, magnets in said drum having radially spaced pole faces near the lower portion of said drum providing strong successive magnetic fields through which said drum rotates, a tank adapted to hold water into which the lower portion of said drum submerges, means dividing said tank into two cells through which said drum conveys magnetic materials said means terminating closely adjacent said drum and extending axially thereof and cooperating therewith to provide a narrow elongated slot through which magnetic materials must pass from one cell to enter the second cell, means for supplying water to said second cell whereby water flows by gravity counter to the direction of rotation of said drum through said slot and into said first named cell, and means for directing a strong sheet-like current of water at said drum between two of said strong magnetic fields adjacent said slot and throughout the length of the latter thereby subjecting magnetic materials to a strong current of washing water adjacent said slot and where said materials pass from one strong magnetic field into another.

8. A magnetic separator including a rotatable drum of non-magnetic material, magnets in said drum having radially spaced pole faces near the lower portion of said drum providing strong successive magnetic fields through which said drum rotates, a tank adapted to hold water into which the lower portion of said drum submerges, means dividing said tank into two cells through which said drum conveys magnetic materials said means terminating closely adjacent said drum and extending axially thereof and cooperating therewith to provide a narrow elongated slot through which magnetic materials must pass from one cell to enter the second cell, and means for directing a strong sheet-like current of water at said drum between two of said strong magnetic fields adjacent said slot and throughout the length of the latter thereby subjecting magnetic materials to a strong current of washing water adjacent said slot and where said materials pass from one strong magnetic field into another.

9. A magnetic separator including means forming a tank adapted to contain water, means dividing said tank into two generally open topped cells, travelling carrier means submerged in said tank for carrying magnetic materials from one of said cells through the other, magnets above said carrier having pole faces near the carrier providing successive strong magnetic fields through which said carrier travels, said dividing means terminating closely adjacent said carrier means and cooperating therewith to provide a narrow elongated slot extending transversely of said carrier through which magnetic materials must pass from one cell to enter the second cell, means for supplying water to both of said cells and for maintaining a greater head of water in said second cell whereby water flows by gravity counter to the direction of travel of said carrier through said slot and into said first cell, and means for directing a strong sheet-like current of water at said carrier between two of said strong magnetic fields adjacent said slot and throughout the length of the latter thereby subjecting magnetic materials to a strong current of washing water adjacent said slot and where said materials pass from one strong magnetic field to another.

10. A magnetic separator including means forming a tank adapted to contain water, means dividing said tank into two generally open topped cells, travelling carrier means submerged in said tank for carrying magnetic materials from one of said cells through the other, magnets above said carrier having pole faces near the carrier providing successive strong magnetic fields through which said carrier travels, said dividing means terminating closely adjacent said carrier means and cooperating therewith to provide a narrow elongated slot extending transversely of said carrier through which magnetic materials must pass from one cell to enter the second cell, means for supplying water to said second cell whereby water flows by gravity counter to the direction of travel of said carrier means through said slot and into said first named cell, and means for directing a strong sheet-like current of water at said carrier between two of said strong magnetic fields adjacent said slot and throughout the length of the latter thereby subjecting magnetic materials to a strong current of washing water adjacent said slot and where said materials pass from one strong magnetic field to another.

11. A magnetic separator including means forming a tank adapted to contain water, means dividing said tank into two generally open topped cells, travelling carrier means submerged in said tank for carrying magnetic materials from one of said cells through the other, magnets above said carrier having pole faces near the carrier providing successive strong magnetic fields through which said carrier travels, said dividing means terminating closely adjacent said carrier means and cooperating therewith to provide a narrow elongated slot extending transversely of said carrier through which magnetic materials must pass from one cell to enter the second cell, and means for directing a strong sheet-like current of water at said carrier between two of said strong magnetic fields adjacent said slot and throughout the length of the latter thereby subjecting magnetic materials to a strong current of washing water adjacent said slot and where said materials pass from one strong magnetic field to another.

No references cited.